(12) United States Patent
Esteve Balducci et al.

(10) Patent No.: US 11,181,382 B2
(45) Date of Patent: *Nov. 23, 2021

(54) GENERATING MAPS OF PRIVATE SPACES USING MOBILE COMPUTING DEVICE SENSORS

(71) Applicant: Microsoft Technology Licensing, LLC, Redmond, WA (US)

(72) Inventors: Juan V. Esteve Balducci, Mercer Island, WA (US); Quentin S. Miller, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 703 days.

This patent is subject to a terminal disclaimer.

(21) Appl. No.: 15/791,039

(22) Filed: Oct. 23, 2017

(65) Prior Publication Data

US 2018/0058859 A1 Mar. 1, 2018

Related U.S. Application Data

(63) Continuation of application No. 12/978,098, filed on Dec. 23, 2010, now Pat. No. 9,823,078.

(51) Int. Cl.
*G01C 21/20* (2006.01)
*G01C 21/32* (2006.01)
*G09B 29/10* (2006.01)
*G06F 16/9032* (2019.01)

(52) U.S. Cl.
CPC ........... *G01C 21/206* (2013.01); *G01C 21/32* (2013.01); *G09B 29/106* (2013.01); *G06F 16/90328* (2019.01)

(58) Field of Classification Search
CPC . G01C 21/206; G01C 21/32; G06F 16/90328; G09B 29/106
See application file for complete search history.

(56) References Cited

U.S. PATENT DOCUMENTS

| 7,323,991 B1 | 1/2008 | Eckert |
| 9,823,078 B2 | 11/2017 | Esteve Balducci et al. |
| 2005/0210131 A1 | 9/2005 | Motoyama et al. |

(Continued)

FOREIGN PATENT DOCUMENTS

| CN | 1734481 | 2/2006 |
| CN | 101184126 | 5/2008 |

(Continued)

OTHER PUBLICATIONS

"Office Action Issued in Korean Application No. 10-2013-7016211", dated Apr. 30, 2018, 7 Pages.

(Continued)

*Primary Examiner* — Shew Fen Lin

(57) ABSTRACT

Digital maps of private spaces may be implemented using mobile computing device sensors. Sensor data may be received from one or more mobile computing devices to determine a digital signature describing a private space. Scheduling data may also be received from the one or more mobile devices. The scheduling data may describe a location associated with the private space to be mapped. A digital map of the private space may then be generated from the digital signature and the location associated with the private space in the scheduling data.

20 Claims, 5 Drawing Sheets

(56) References Cited

U.S. PATENT DOCUMENTS

| | | | |
|---|---|---|---|
| 2006/0271274 | A1* | 11/2006 | Saarikivi ............... G01C 21/00 701/433 |
| 2007/0001904 | A1* | 1/2007 | Mendelson ........... H04W 4/024 342/450 |
| 2007/0198128 | A1 | 8/2007 | Ziegler et al. |
| 2008/0155453 | A1 | 6/2008 | Othmer |
| 2008/0195312 | A1 | 8/2008 | Aaron et al. |
| 2008/0256097 | A1* | 10/2008 | Messer .................. H04L 67/16 |
| 2008/0262721 | A1 | 10/2008 | Guo et al. |
| 2009/0006994 | A1* | 1/2009 | Forstall ................. G01C 21/26 715/764 |
| 2009/0036148 | A1* | 2/2009 | Yach .................... G06Q 10/109 455/457 |
| 2009/0105947 | A1 | 4/2009 | Okanobu |
| 2010/0075697 | A1 | 3/2010 | Gupta |
| 2010/0127935 | A1* | 5/2010 | Huang ..................... G01S 1/68 342/463 |
| 2010/0026906 | A1 | 11/2010 | Nachesa et al. |
| 2010/0287025 | A1 | 11/2010 | Fletcher et al. |
| 2011/0060808 | A1* | 3/2011 | Martin ............... G06F 16/9537 709/217 |
| 2011/0084804 | A1* | 4/2011 | Khorashadi ............ H04L 67/18 340/8.1 |
| 2011/0153190 | A1* | 6/2011 | Rolinski ............. G01C 21/367 701/533 |
| 2012/0102409 | A1* | 4/2012 | Fan ....................... H04W 4/00 715/738 |

FOREIGN PATENT DOCUMENTS

| | | |
|---|---|---|
| EP | 2053358 | 4/2009 |
| JP | 2010175504 | 8/2004 |
| JP | 2004240703 | 4/2006 |
| JP | 2006113744 | 8/2010 |
| KR | 20080089148 A | 10/2008 |
| KR | 20100005488 A | 1/2010 |
| RU | 2009109410 | 9/2010 |
| RU | 2008138720 | 10/2010 |
| WO | 2008020521 | 2/2008 |

OTHER PUBLICATIONS

"Office Action Issued In Indian Patent Application No. 4610/CHENP/2013", dated Sep. 25, 2019, 7 Pages.

"Notice of Allowance Issued in Korean Patent Application No. 10-2013-7016211", dated Oct. 31, 2018, 5 Pages.

Australian Notice of Allowance in 2011349613, dated Jun. 15, 2016, 2 pages.

Australian Office Action in 2011349613, dated Apr. 5, 2016, 2 pages.

Canadian Office Action in Patent Application No. 2821404, dated Sep. 6, 2017, 5 Pages.

Chinese Notice of Allowance in 201110435871.2, dated Mar. 24, 2016, 4 pages.

Chinese Office Action in 201110435871.2, dated Jun. 5, 2014, 14 pages.

Chinese Office Action in 201110435871.2, dated Feb. 6, 2015, 10 pages.

Chinese Office Action in 201110435871.2, dated Aug. 3, 2015, 10 pages.

Chinese Office Action in 201110435871.2, dated Nov. 24, 2015, 10 pages.

Cristiano Di Flora et al., "Indoor and outdoor location based services for portable wireless devices", available at: http://ieeexplore.ieee.org/stamp/stamp.jsp?tp=&arnumber=1437182, 2005, pp. 1-7.

Donald J. Patterson et al, "Nomatic: Location By, For, and Of Crowds", available at: http://research.microsoft.com/en-us/um/people/jckrumm/LoCA2006_papers/1568978627%20Patterson.pdf, Oct. 7, 2010, pp. 1-18.

European Extended Search Report in 11851285.4, dated May 8, 2014, 12 pages.

European Notice of Allowance in 11851285.4, dated Feb. 10, 2016, 7 pages.

European Office Action in 11851285.4, dated Feb. 9, 2015, 4 pages.

Japanese Notice of Allowance in 2015546253, dated Jan. 24, 2016, 3 pages. (No English Trans.).

Japanese Office Action in 2013546253, dated Sep. 30, 2015, 2 pages.

JP Manninen, "Next challenge for location industry: mapping the great indoors", available at: http://venturebeat.com/2010/04/30/king-of-indoor-maps/, Apr. 30, 2010, pp. 1-11.

M.R. Malek et al., "Using Smart Map in a Mobile Information Environment for Tourism", available at: http://www.isprs.org/proceedings/XXXVI/5-C53/papers/FP094.pdf, Oct. 7, 2010, pp. 1-4.

Miguel Encarnaceo, "The World According to Bing", available at: http://ieeexplore.ieee.org/stamp/stamp.jsp?tp=&arnumber=5492970, 2010, 3 pages.

PCT International Preliminary Report on Patentability in PCT/US2011/065453, dated Jun. 25, 2013, 4 pages.

PCT International Search Report in PCT/US2011/065453, dated Aug. 27, 2012, 8 pages.

Russian Notice of Allowance in 2013128542, dated Apr. 18, 2016, 18 pages.

Russian Office Action in 2013128542, dated Nov. 25, 2015, 4 pages.

Tomache Delev et al., "Place-Tags, Discovering and Promoting Places Through Mobile Phones and Collaborative Filtering", available at: http://ieeexplore.ieee.org/stamp/stamp.jsp?arnumber=05546399, Jun. 21, 2010, pp. 1-6.

U.S. Appl. No. 12/978,098, Amendment and Response filed Oct. 6, 2017, 9 pages.

U.S. Appl. No. 12/978,098, Amendment and Response filed Mar. 28, 2013, 13 pages.

U.S. Appl. No. 12/978,098, Amendment and Response filed Jul. 25, 2013, 13 pages.

U.S. Appl. No. 12/978,098, Amendment and Response filed Jul. 13, 2015, 14 pages.

U.S. Appl. No. 12/978,098, Amendment and Response filed Jan. 7, 2016, 14 pages.

U.S. Appl. No. 12/978,098, Amendment and Response filed Nov. 23, 2016, 13 pages.

U.S. Appl. No. 12/978,098, Amendment and Response filed Jun. 21, 2017, 10 pages.

U.S. Appl. No. 12/978,098, Notice of Allowance dated Jul. 6, 2017, 5 pages.

U.S. Appl. No. 12/978,098, Office Action dated Dec. 28, 2012, 15 pages.

U.S. Appl. No. 12/978,098, Office Action dated Apr. 25, 2013, 13 pages.

U.S. Appl. No. 12/978,098, Office Action dated Mar. 12, 2015, 17 pages.

U.S. Appl. No. 12/978,098, Office Action dated Sep. 17, 2015, 18 pages.

U.S. Appl. No. 12/978,098, Office Action dated Aug. 23, 2016, 19 pages.

U.S. Appl. No. 12/978,098, Office Action dated Dec. 22, 2016, 8 pages.

U.S. Appl. No. 12/978,098, USPTO Response dated Oct. 17, 2017, 2 pages.

Yi-Chao Chen et al., "Sensor-Assisted Wi-Fi Indoor Location System for Adapting to Environmental Dynamics", available at: http://delivery.acm.org/10.1145/1090000/1089466/p118-chen.pdf?key1=1089466&key2=9557246821&coll=GUIDE&dl=GUIDE&CFID=104734134&CFTOKEN=57463337, Oct. 10, 2015, pp. 1-8.

Pendleton, Chris, "The World According to Bing", In IEEE Computer Graphics and Applications, vol. 30, Issue 4, Jun. 24, 2010, 3 Pages.

Canadian Office Action Issued in Canadian Patent Application No. 2,821,404, dated Sep. 6, 2017, 5 Pages.

Japanese Notice of Allowance Issued in Japanese Patent Application No. 2013-546253, dated Dec. 25, 2015, 4 Pages.

(56) References Cited

OTHER PUBLICATIONS

Korean Office Action Issued in Korean Patent Application No. 10-2013-7016211, dated Nov. 13, 2017, 7 Pages.

* cited by examiner

GENERATING MAPS OF PRIVATE SPACES USING MOBILE COMPUTING DEVICE SENSORS

CROSS-REFERENCE TO RELATED APPLICATIONS

This application is a continuation of U.S. application Ser. No. 12/978,098, now U.S. Pat. No. 9,823,078, filed Dec. 23, 2010 and titled "Generating Maps of Private Spaces Using Mobile Computing Device Sensors," the disclosure of which is hereby incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Computer users may utilize a number of public online services to map public spaces. However, online current mapping services rely on the tedious gathering of data at multiple locations by a centralized service. Moreover, adapting to changes in public spaces requiring the updating of current maps is often difficult without coordination between a third party and the centralized service to perform tasks such as physically roaming the public spaces with sensors, making note of any changes, and communicating the changes to the centralized service so that the current maps may be rehabilitated. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for generating maps of private spaces using mobile computing device sensors. Sensor data may be received from one or more mobile computing devices to determine a digital signature describing a private space. Scheduling data may also be received from the one or more mobile devices. The scheduling data may describe a location associated with the private space to be mapped. A digital map of the private space may then be generated from the digital signature and the location associated with the private space in the scheduling data.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for generating maps of private spaces using mobile computing device sensors. Sensor data may be received from one or more mobile computing devices to determine a digital signature describing a private space. Scheduling data may also be received from the one or more mobile devices. The scheduling data may describe a location associated with the private space to be mapped. A digital map of the private space may then be generated from the digital signature and the location associated with the private space in the scheduling data.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
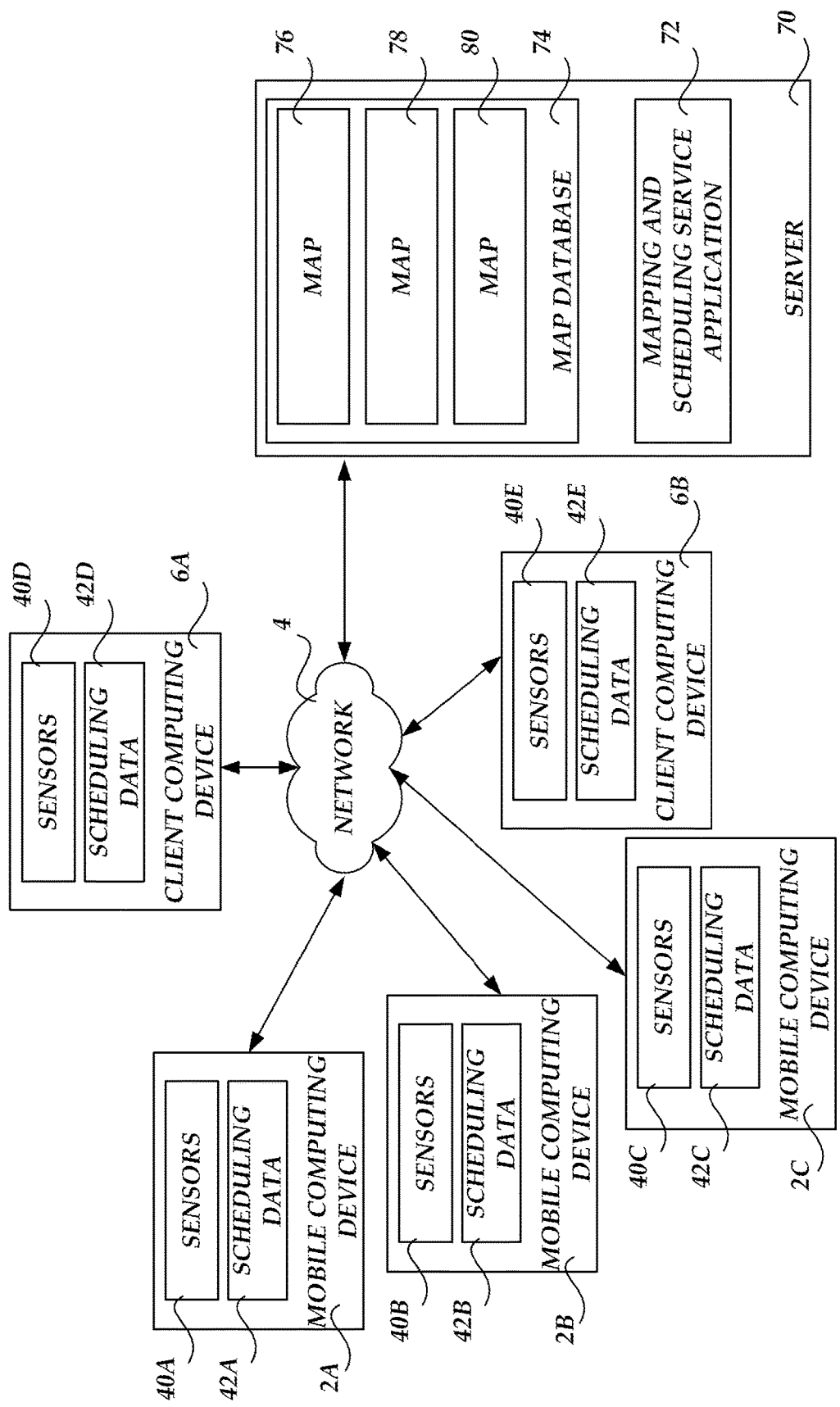
FIG. 1 is a block diagram illustrating a network architecture for generating maps of private spaces using mobile computing device sensors, in accordance with various embodiments.

Referring now to the drawings, in which like numerals represent like elements through the several figures, various aspects of the present invention will be described. FIG. 1 is a block diagram illustrating a network architecture for generating maps of private spaces using mobile computing device sensors, in accordance with various embodiments. The network architecture includes mobile computing devices 2A-2C which may be in communication with client computing devices 6A-6B and server 70 over a network 4. In accordance with various embodiments, the network 4 may comprise a local network or a wide area network (e.g., the Internet).

The mobile computing devices 2A-2C may include sensors 40A-40C and scheduling data 42A-42C, respectively. In accordance with various embodiments, the mobile computing device 2 may comprise a mobile telephone, "smartphone," tablet or laptop computer which is capable of executing one or more application programs. As is known by those skilled in the art, a "smartphone" may comprise a mobile phone having computer functionality and/or which is capable of running operating system software to provide a standardized interface and platform for application developers.

The sensors 40A-40C (which may be in or connected to) the mobile computing devices 2A-2C may be capable of measuring/detecting a number of types of data associated with the mobile computing devices 2A-2C including, but not limited to, altitude, location, signal strength, orientation and force. The sensors 40A-40C may also comprise the ability to detect the presence of a wireless network (e.g., a "Wi-Fi"

network), Wi-Fi access point or other mobile computing devices (e.g., via BLUETOOTH wireless technology) without actually making a network or a device connection). Thus, in accordance with an embodiment, the sensors 40A-40C, which should be known to those skilled in the art, may include an altimeter, a GPS, a wireless network interface device (for signal strength detection and for detecting and connecting to other wireless networks/devices), a gyroscope, and a force sensor. As will be described in greater detail herein with respect to FIGS. 4-5, the sensors 40A-40C may be utilized to create a "digital signature" for mapping a private space (e.g., a conference room in an office building) in accordance with various embodiments. It should be understood, in accordance with and embodiment, that the sensors 40A-40C may not necessarily be physically connected to the mobile computing devices 2A-2C but may connected wirelessly for the exchange of data. For example, the sensors 40A-40C may comprise self-powering (e.g., photovoltaic) sensors that may be attached to a wall and broadcast measurement data (e.g., location information) utilizing any of a number of low power wireless communication technologies known to those skilled in the art. For example, the sensors 40A-40C may utilize BLUETOOTH wireless technology the suite of low power communication protocols based on the ZIGBEE specification.

In accordance with an embodiment, the scheduling data 42A-42C may comprise location based information found in the respective schedules of users associated with the mobile computing devices 2A-2C. In particular, the scheduling data 42A-42C may comprise location data compiled by a scheduling service on the server 70. For example, the scheduling data 42A-42C may identify a 3 PM meeting in conference room "J" of an office building, for users of the mobile computing devices 2A-2C. In accordance with an embodiment, the location data in the scheduling data 42A-42C may be communicated in a payload over a communication channel from the mobile computing devices 2A-2C to the server 70. In accordance with an embodiment, the communication channel may comprise the EXCHANGE ACTIVESYNC protocol developed by MICROSOFT CORPORATION of Redmond, Wash. As will be described in greater detail below with respect to FIGS. 4-5, the location data in the scheduling data 42A-42C may be utilized, in combination with data measured by the sensors 40A-40C, to generate maps of private spaces. It should be understood that the generation of maps, as defined herein, includes enhancing publically available maps with private spaces information. In accordance with an embodiment, the publically available maps may be provided by an online web service, such as the BING MAPS web mapping service from MICROSOFT CORPORATION of Redmond, Wash. It should be appreciated that public maps and mapping services from other providers may also be utilized in accordance with the various embodiments described herein. It should be understood, in accordance with various embodiments, that "private spaces" may include, but are not limited to, various locations, including individual offices and meeting rooms (e.g., conference rooms and auditoriums) in a building or buildings within the grounds of a business enterprise to which the general public (i.e., public mapping companies) lack physical access and/or access to the names of the various locations contained therein.

The client computing devices 6A-6B may include sensors 40D-40E and scheduling data 42D-42E, respectively, which may be similar to the sensors 40A-40C and the scheduling data 42A-42C in the mobile computing devices 2A-2C (discussed above). In accordance with various embodiments, the client computing devices 2 may comprise a desktop or workstation computer which is capable of executing one or more application programs. In accordance with various embodiments, the client computing devices 6A-6B may also be utilized as sensor inputs in conjunction with, and in the same manner as, the mobile computing devices 2A-2C, with respect to mapping private spaces.

The server 70 may comprise a mapping and scheduling service application 72 and a map database 74. In accordance with various embodiments, the server 70 may provide both a private mapping service and a private scheduling service for scheduling and mapping private locations associated with users of the mobile computing devices 2A-2C and the client computing devices 6A-6B. It should be understood that the private mapping service and the private scheduling service may comprise a single combined service or, alternatively, two separate services. Thus, it should be appreciated that the server 70 may represent services hosted on multiple servers or other complex computer systems. In accordance with an embodiment, the mapping and scheduling service application 72 may be configured to generate maps of private spaces using sensor data collected from the mobile sensors 40A-40C (and optionally the sensors 40D-40E) as well as the scheduling data 42A-42C (and optionally the scheduling data 42D-42E). In particular, and as will be described in greater detail below with respect to FIGS. 4-5, the mapping and scheduling service application 72 may be configured to gather sensor and location data from the mobile computing devices 2A-2C (and optionally the computing devices 6A-6B) and run a statistical analysis to assign location names (and the electronic definition thereof) with a higher than average degree of certainty. Furthermore, the mapping and scheduling service application 72 may be configured to leverage large numbers of connected mobile devices to "crowd source" the naming of private spaces by using statistics (i.e., density of information at a given time and over a period of time) to determine the actual naming of private spaces. In accordance with an embodiment, the mapping and scheduling service application 72 may comprise a collaborative server application such as the EXCHANGE SERVER collaborative application from MICROSOFT CORPORATION of Redmond, Wash. It should be appreciated that other collaborative server applications from other manufacturers may be utilized in accordance with the various embodiments described herein. The map database 74 may store maps 76, 78 and 80. The maps 76, 78 and 80 may represent digital maps of private spaces generated by the mapping and scheduling service application 72 using received sensor data collected from the mobile sensors 40A-40C (and optionally the sensors 40D-40E) and location data received from the scheduling data 42A-42C (and optionally the scheduling data 42D-42E). It should be understood that the maps 76, 78 and 80 may comprise publically available maps (such as those provided by an online mapping service) which are "tagged" or enhanced with private space sensor data and location data determined by the mapping and scheduling service application 72. Thus, as discussed above, the "generation" of digital maps of private spaces may include enhancing or tagging publically available maps with private space information (i.e., the gathered sensor and location data from the mobile computing devices 2A-2C (and optionally the computing devices 6A-6B)). It should further be understood that the enhanced or tagged public maps may not be re-shared with the online mapping service from which they were retrieved or otherwise made public, thereby insuring their privacy.

Figure 2:
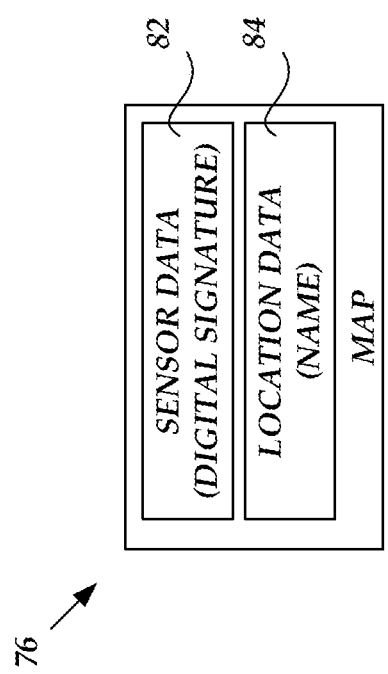
FIG. 2 is a block diagram illustrating the components of a digital map generated for a private space using mobile computing device sensors, in accordance with various embodiments.

FIG. 2 is a block diagram illustrating the components of a digital map 76, generated by the mapping and scheduling service application 72, for a private space using mobile computing device sensors, in accordance with various embodiments. The map 76 includes sensor data 82 which may represent a digital signature of a private space. The sensor data 82 may include data collected from the sensors 40A-40C in the mobile computing devices 2A-2C associated with the name of a single location identified as location data 84 which in turn may be collected from the scheduling data 42A-42C. The location data 84 may include a name for a mapped private space and may be obtained from information contained in the scheduling data 42A-42C (e.g., the name of a conference room for a scheduled meeting) or from nicknames or other colloquialisms for a private space which may be utilized by users of the mobile computing devices 2A-2C.

Exemplary Operating Environment

Figure 3:
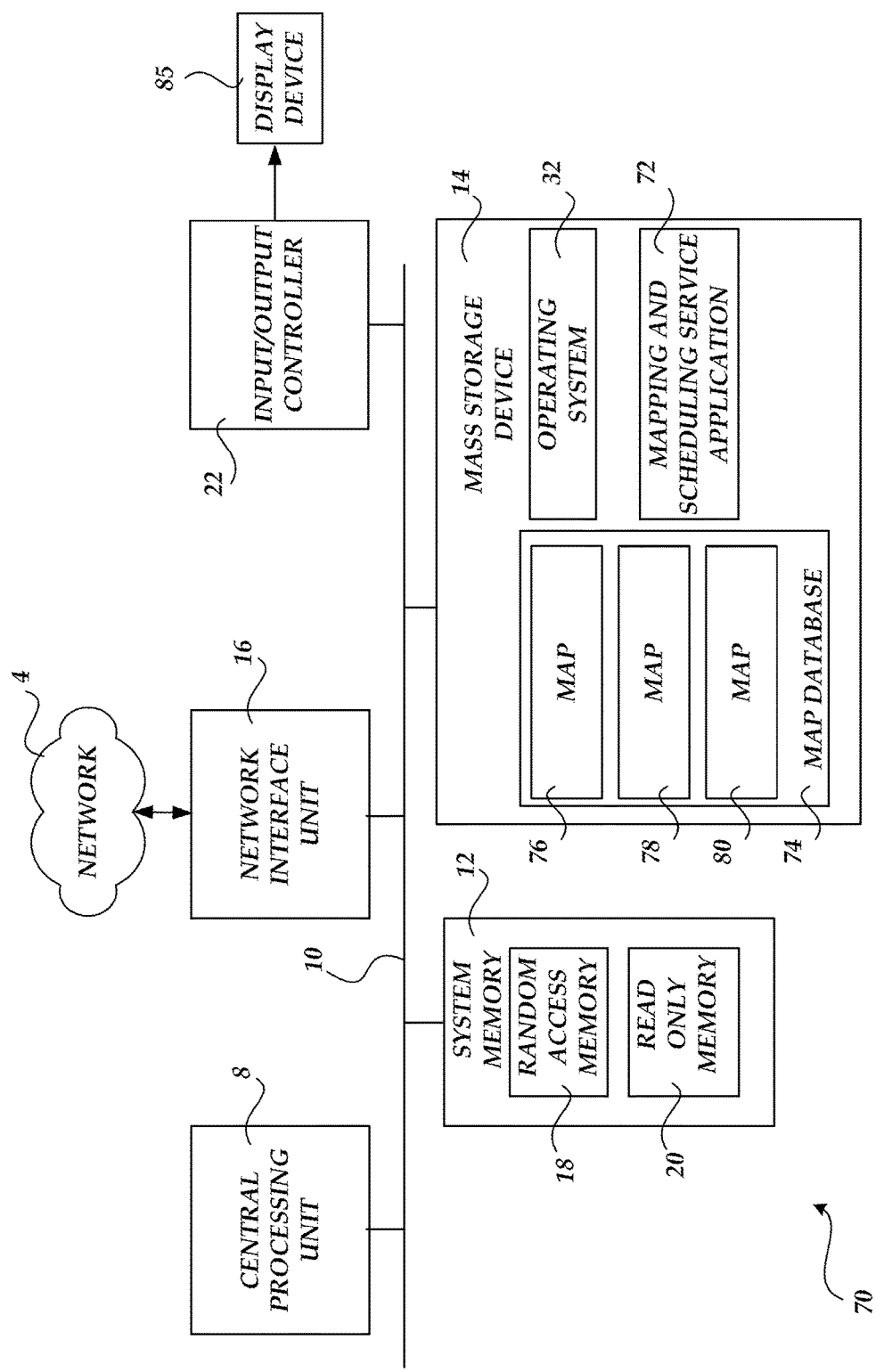
FIG. 3 is a block diagram illustrating server computing environment which may be utilized for generating maps of private spaces using mobile computing device sensors, in accordance with various embodiments.

Referring now to FIG. 3, the following discussion is intended to provide a brief, general description of a suitable computing environment in which various illustrative embodiments may be implemented. While various embodiments will be described in the general context of program modules that execute in conjunction with program modules that run on an operating system on a computing device, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with a number of computer system configurations, including handheld devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 3 shows the server 70 which may include a computer capable of executing one or more application programs. The server 70 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The server 70 may further include a mass storage device 14 for storing an operating system 32, the mapping and scheduling service application 72 and the map database 74 (including the maps 76, 78 and 80). In accordance with various embodiments, the operating system 32 may be suitable for controlling the operation of a networked computer, such as the WINDOWS operating systems from MICROSOFT CORPORATION of Redmond, Wash. The mass storage device 14 is connected to the CPU 8 through a mass storage controller (not shown) connected to the bus 10. The mass storage device 14 and its associated computer-readable media provide non-volatile storage for the server 70. The term computer-readable media as used herein may include computer storage media. Computer storage media may include volatile and nonvolatile, removable and non-removable media implemented in any method or technology for storage of information, such as computer readable instructions, data structures, program modules, or other data. Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the server 70. Any such computer storage media may be part of the server 70.

The term computer-readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

According to various embodiments of the invention, the server 70 may operate in a networked environment using logical connections to remote computers through the network 4. The server 70 may connect to the network 4 through a network interface unit 16 connected to the bus 10. It should be appreciated that the network interface unit 16 may also be utilized to connect to other types of networks and remote computing systems. The availability server 70 may also include an input/output controller 22 for receiving and processing input from a number of input types, including a keyboard, mouse, pen, stylus, finger, and/or other means (not shown). Similarly, the input/output controller 22 may provide output to a display device 85 as well as a printer, or other type of output device (not shown). It should be appreciated that the mobile computing devices 2A-2C and the client computing devices 6A-6B, shown in FIG. 1, may include many of the conventional components shown and discussed above with respect to the availability server 70. In accordance with various embodiments, the mobile computing devices 2A-2C may also include additional conventional components (not shown) such as a wireless radio, a power supply (e.g., a removable or non-removable battery), an array of various sensors and a real-time clock.

Figure 4:
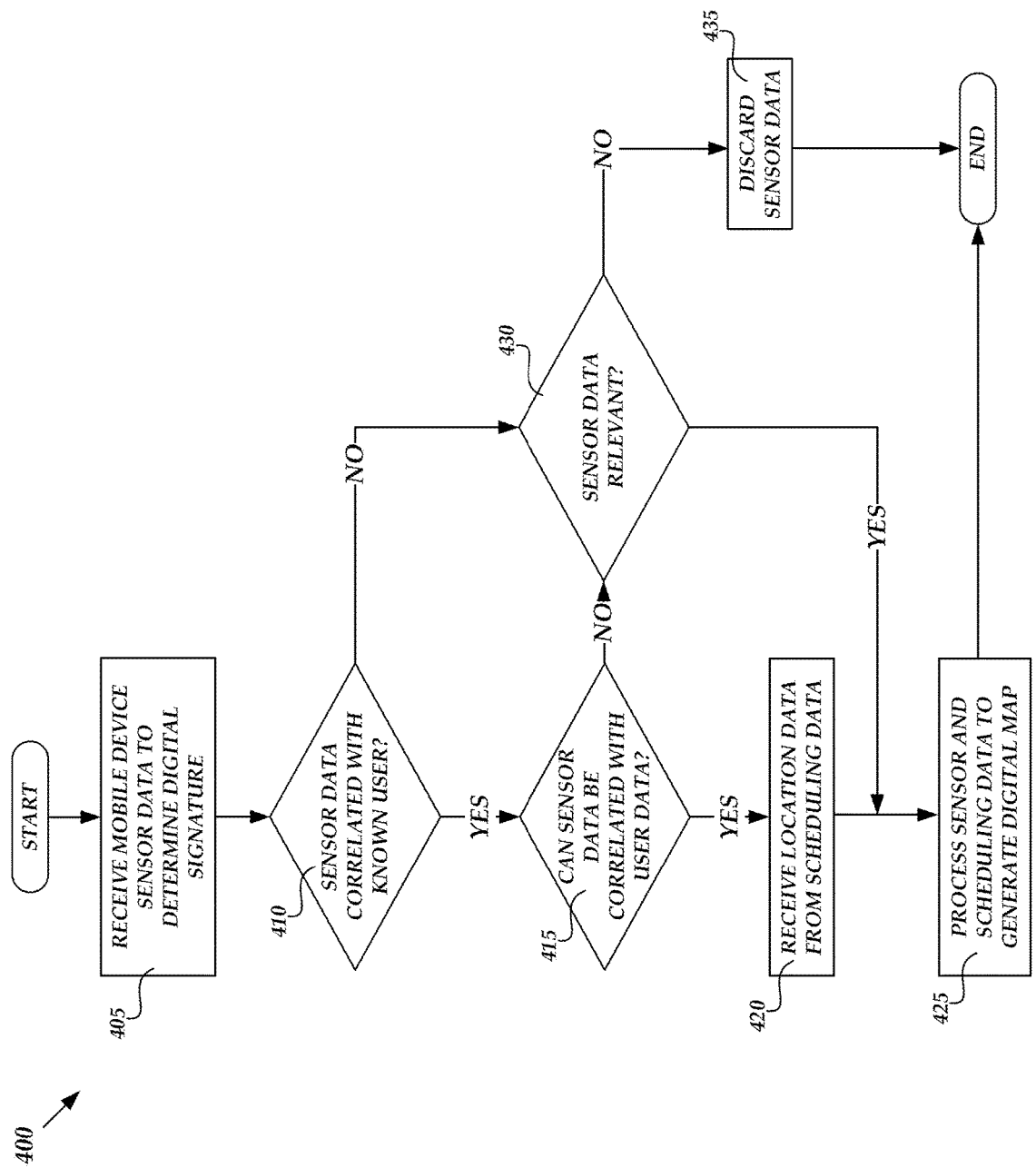
FIG. 4 is a flow diagram illustrating a routine for gathering sensor data for use in generating maps of private spaces, in accordance with various embodiments.

FIG. 4 is a flow diagram illustrating a routine 400 for gathering sensor data for use in generating maps of private spaces, in accordance with various embodiments. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 4-5 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 400 begins at operation 405, where the mapping and scheduling application 72 (hereinafter referred to as the "application 72"), executing on the server 70, receives mobile device sensor data to determine a digital signature. In particular, the application 72 may receive sensor data measured by the sensors in one or more of the mobile computing devices 2A-2C to determine a digital signature describing a private space. In accordance with an embodiment, the sensor data (as well as location data) may always be sent from the mobile computing devices 2A-2C to the server 70 as sensor data is being detected by the sensors 40A-40C. Alternatively, the sensor data (as well as location data) may be sent only after the application 72 prompting the users of the mobile computing devices 2A-2C. Alternatively, the sensor data (as well as location data) may be sent at appropriate intervals as determined by the application 72. Moreover, the application 72 may also require a one-time user consent for the sending of the sensor data (as well as location data) from the mobile computing devices 2A-2C to the server 70 for all future interactions, prompt users before every request to send the sensor data (as well as the location data), or require users to trigger the sending of the sensor data (as well as the location data) to the server 70. It should be appreciated that privacy and legal considerations in different geographical locations may be relied upon for determining the collection of the sensor data (as well as the location data) by the application 72. It should be further appreciated that, in accordance with an embodiment, the collection of the sensor and location data, by the application 72, may be temporally restricted to a company's business hours and further geographically restricted to be confined within a company's grounds.

From operation 405, the routine 400 continues to operation 410, where the application 72 determines if the received sensor data is correlated with a known user. In particular, the application 72 may determine if the received sensor data corresponds to a user of one of the mobile computing devices 2A, 2B or 2C whose presence in the network is recognized by the server 70. If, at operation 410, the application 72 determines that the received sensor data can be correlated with a known user, then the routine 400 continues to operation 415. If however, at operation 410, the application 72 determines that the received sensor data cannot be correlated with a known user, then the routine 400 branches to operation 430.

At operation 415, the application 72 determines whether the received sensor data can be correlated with user data. For example, the application 72 may compare received sensor data from the mobile computing device 2A to the sensor data previously received from users of the mobile computing devices 2B and 2C to determine if all three devices have the same digital signature. A digital signature may be based on Wi-Fi access point signal strength, altimeter data, GPS data, mobile operator signal strength, etc., as determined by the sensors 40A-40C. If, at operation 415, the application 72 determines that the received sensor data can be correlated with user data, then the routine 400 continues to operation 420. If however, at operation 415, the application 72 determines that the received sensor data cannot be correlated with user data, then the routine 400 branches to operation 430.

At operation 420, the application 72 receives location data from scheduling data associated with mobile computing device from which the sensor data was received. For example, the application 72 may receive the scheduling data 42A from the mobile computing device 2A whose digital signature was previously determined based on the sensor data 40A.

From operation 420, the routine 400 continues to operation 425 where the application 72 processes the sensor and scheduling data to generate a digital map. In particular, the application 72 may build a digital map of the private space (e.g., a conference room) described by the digital signature determined from the sensor data and named as a location in the scheduling data. As discussed above with respect to FIG. 1, digital maps may be stored in a map database, such as the map database 74. From operation 425, the routine 400 then ends.

At operation 430, the application 72 determines whether the received sensor data is relevant. For example, if the sensor data was received from a user at 3:10 PM and it can be further determined, by the application 72, from scheduling data associated with the same user that the user has a meeting in conference room "J" from 3 PM to 4 PM, then the application 72 may determine that the sensor data is relevant with respect to the location of conference room J. If, at operation 430, the application 72 determines that the received sensor data is relevant, then the routine 400 returns to operation 425. If however, at operation 430, the application 72 determines that the received sensor data is not relevant, then the routine 400 continues to operation 435 where the received sensor data is discarded. From operation 435, the routine 400 then ends.

Figure 5:
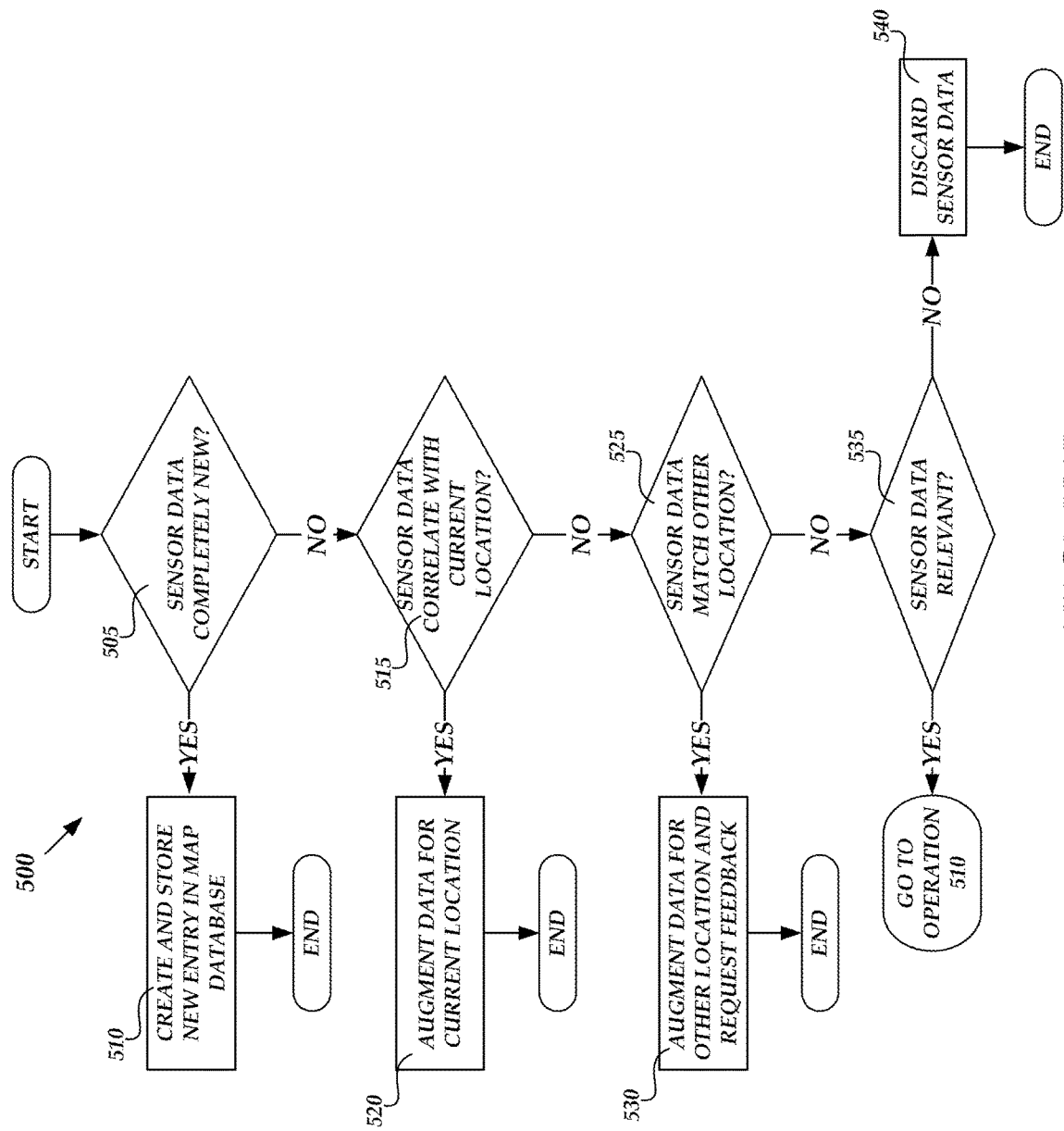
FIG. 5 is a flow diagram illustrating a routine for the processing of sensor data and the generation of maps of private spaces, in accordance with various embodiments.

FIG. 5 is a flow diagram illustrating a routine 500 for the processing of sensor data and the generation of maps of private spaces, in accordance with various embodiments. The routine 500 begins at operation 505, where the application 72, executing on the server 70, determines if sensor data received from one or more of the mobile computing devices 2A-2C is completely new data. In particular, the application 72 may be configured to determine if the received sensor data (i.e., the digital signature) matches a digital signature for a map stored in the map database 74. If, at operation 505, the application 72 determines that the received sensor data is completely new data, then the routine 500 continues to operation 510. If however, at operation 505, the application 72 determines that the received sensor data is not completely new data, then the routine 500 branches to operation 515.

At operation 510, the application 72, upon determining that the received sensor data is completely new data, creates and stores an entry for the new sensor data in the map database 74. In particular, the application 72 may determine from scheduling data associated with the mobile computing device from which the new sensor data was received, the name of a location to associate with the new sensor data. For example, if the new sensor data was collected from the mobile computing device 2A at 3 PM and the scheduling data associated with the mobile computing device 2A indicates that a user is in the "Stevens auditorium" in building "K" at the user's workplace, then the application 72 may create a new entry for the aforementioned location (i.e., "Stevens auditorium") and store the received sensor data describing this location in building "K" with the location name "Stevens auditorium." From operation 510, the routine 500 then ends.

At operation 515, the application 72, upon determining that the received sensor data is not completely new data, may determine whether the received sensor data can be correlated with a current location at least partially associated with the received sensor data. For example, the received sensor data may include augmented GPS sensor data measured by a mobile computing device which has an augmented GPS sensor for measuring the relative forces acting on the device to determine elevation change and travel within a building. In addition, the received sensor data may also include data identical to sensor data measured by other mobile computing devices which are currently located in the same location as the mobile computing device which has the augmented sensor. If, at operation 515, the application 72 determines that the received sensor data can be correlated with a current location, then the routine 500 continues to operation 520. If however, at operation 515, the application 72 determines that the received sensor data cannot be correlated with a current location, then the routine 500 branches to operation 525.

At operation 520, the application 72, upon determining that the received sensor data can be correlated with a current location, augments the data for the current location. In particular, the application 72 may augment the current location and a stored sensor data set for the location with the augmented sensor data (e.g., the augmented GPS sensor data) discussed above with respect to operation 515. It should be appreciated, that in accordance with an embodiment, it may be possible to use a large number of sensor measurements to reduce error which may be associated with augmented sensor data (such as estimated GPS measurements) and thereby increase the accuracy of a location's actual GPS location as well as its altitude. Thus, over time, the definition of a given location would continue to get better. From operation 520, the routine 500 then ends.

At operation 525, the application 72, upon determining that the received sensor data cannot be correlated with a current location, determines whether the sensor data matches another location. In particular, the application 72 may be configured for "outlier" data detection in which the received sensor data is determined to be irrelevant for a current location. For example, application 72 may determine from the scheduling data 42A-42C for mobile computing devices 2A-2C indicate that the users of these devices are scheduled to be in a meeting in conference room "J" at 3:10 PM but may also determined that the sensor data for the mobile computing device 2B indicates that the mobile computing device is in another location (such as the user's office) at the scheduled meeting time. Thus, the received sensor data from the mobile computing device 2B is dissimilar to the received sensor data from the mobile computing devices 2A and 2C and is irrelevant to the digital definition of conference room "J." However, the received sensor data from the mobile computing device 2B may correlate to another location stored in the map database 74, such as the user's office. If, at operation 525, the application 72 determines that the received sensor data matches another location, then the routine 500 continues to operation 530. If however, at operation 525, the application 72 determines that the received sensor data does not match another location, then the routine 500 branches to operation 535.

At operation 530, the application 72, upon determining that the received sensor data matches another location, augments the data for the other location and may further request feedback from a user of the mobile computing device from which the sensor data was received. For example, the application 72 may augment the other location associated with the user of the mobile computing device 2B described at operation 525 (above) and a stored sensor data set for the location with augmented sensor data corresponding to the user's office. It should be understood that, in accordance with an embodiment, the application 72 may also be configured to confirm a digital signature by actually querying a user for feedback in order to validate information. For example, the application 72 may send a message asking the user of the mobile computing device 2B, who according to the scheduling data 42B is scheduled to be in conference room "J" at 3:10 PM, is currently attending a meeting in the aforementioned conference room (despite the received contrary sensor data). From operation 530, the routine 500 then ends.

At operation 535, the application 72, upon determining that the received sensor data does not match another location, determines whether the received sensor data is relevant. In particular, the application 72 may determine that the received sensor data corresponds to a sensor data set stored in the map database 74, but that the location data (retrieved from user scheduling data) associated with the received sensor data, is not stored in the map database 74. If, at operation 535, the application 72 determines that the received sensor data is relevant, then the routine 500 returns to operation 510. In accordance with an embodiment, the received sensor data may be determined to be relevant if the location data includes information pertaining to a conference room or an office associated with a place of business. It should be appreciated that the aforementioned situation may occur when a change takes place to a space used by a company's employees. For example, a remodeling project may have recently been undertaken to breakup conference room "J" (and other surrounding rooms) to create a new auditorium. The application 72, having not yet been updated, would not immediately know that the conference room is no longer there but would determine over time from scheduling data that the area defined by sensor data as conference room "J" was now being referred to as the "Newton Auditorium." If, at operation 535, the application 72 determines that the received sensor data is irrelevant, then the routine 500 continues to operation 540.

At operation 540, the application 72, upon determining that the received sensor data is irrelevant, may discard the received sensor data. For example, the application 72 may determine that the received sensor data corresponds to a sensor data set in the map database 74 but that the user's scheduling data indicates that the user is on vacation or out of the office. This situation may occur, for example, when the user is at her company work site but merely visiting a colleague on an off-day. From operation 540, the routine 500 then ends.

It should be understood that in accordance with another embodiment the application 72 may be configured, in response to receiving augmented sensor (e.g., GPS) data for a private space, to actively query the user of the mobile computing device which provided the augmented sensor data and to further tag the private space with a more precise location so as to improve building navigation, etc. In accordance with another embodiment, users of the mobile computing devices 2A-2C and the client computing devices 6A-6C may be able to delete sensor and/or scheduling data gathered from these devices by the application 72 so as to fulfill legal and privacy requirements which may exist in the users' geographical area. In accordance with another embodiment, the application 72 may be configured to automatically delete entries from the map database 74 which haven't been accessed, augmented or otherwise updated after a predetermined time period has elapsed.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method of generating maps of private spaces using mobile computing device sensors, comprising:
confining a collection of sensor data from a mobile computing device to a geographically restricted area;
receiving the confined sensor data from the mobile computing device, the received sensor data including measurement information from a plurality of different sensors of the mobile computing device;
determining a digital signature based on the measurement information received from the plurality of different sensors of the mobile computing device, the digital signature corresponding to a private space and based on at least one of a Wi-Fi access point signal strength, altimeter data, GPS data, and mobile operator signal strength;
receiving other sensor data and location data gathered from a plurality of other mobile computing devices, the location data describing a location and a time of an event, wherein the other sensor data is utilized to create other digital signatures for mapping private spaces;
determining that the time of the event corresponds to a time when the confined sensor data was received;
determining that a density of the other sensor data and the location data gathered from the plurality of other mobile computing devices indicates that a location name is associated with the location;
assigning the location name to the location based on the digital signature, the location data, and the location data gathered from the plurality of other mobile computing devices; and
updating a map database that stores a digital map of a private space, wherein the updating includes assigning the location name to the private space, wherein the private space is located, at least in part, at the location.

2. The method of claim 1, further comprising:
determining that the received sensor data is correlated with at least one known user of the mobile computing device; and
determining a correlation between the received sensor data and the location data.

3. The method of claim 2, further comprising:
determining that received sensor data from a second mobile computing device is irrelevant with respect to the location data; and
discarding the received sensor data from the second mobile computing device.

4. The method of claim 1, further comprising:
generating the digital map of the private space from the digital signature and the location associated with the private space; and
enhancing a public map with the digital signature and the location associated with the private space.

5. The method of claim 1, further comprising:
determining that the received sensor data comprises new sensor data;
creating a new entry for the location associated with the private space in a database; and
storing the new sensor data and a name associated with the new entry in the database.

6. The method of claim 1, further comprising:
determining that the received sensor data comprises a combination of new sensor data and the sensor data associated with the private space which has been previously stored in a database;
determining a correlation between the new sensor data and the location associated with the private space; and
augmenting the previously stored sensor data and the location associated with the private space with the new sensor data to generate a digital map.

7. The method of claim 1, further comprising:
determining that the received sensor data comprises a combination of new sensor data and the sensor data associated with the private space which has been previously stored in a database;
determining a correlation between the new sensor data and another location associated with another private space;
augmenting the location and sensor data associated with another location with the new sensor data to generate a digital map; and
sending a query to the at least one mobile computing device to confirm the digital signature in the digital map.

8. The method of claim 1, further comprising:
determining that the received sensor data is irrelevant with respect to sensor data associated with the private space which has been previously stored in a database and another location associated with another private space; and
discarding the received sensor data.

9. A server for generating maps of private spaces using mobile computing device sensors, comprising:
a memory for storing executable program code; and
a processor, functionally coupled to the memory, the processor being responsive to computer-executable instructions contained in the program code and operative to:
confine a collection of sensor data from at least one mobile computing device to a geographically restricted area;
retrieve the confined sensor data from the at least one mobile computing device to determine a digital signature describing a private space within the geographically restricted area, the retrieved sensor data including measurement information from a plurality of different sensors of the at least one mobile computing device and at least one sensor of the plurality of different sensors is a global positioning system (GPS) sensor, wherein the digital signature is based on the measurement information from the plurality of different sensors;
retrieve other sensor data and scheduling data gathered from at least one different mobile computing device, the scheduling data describing a location and name associated with the private space and a time of an event, wherein the other sensor data is utilized to create other digital signatures for mapping private spaces;
determine that the time of the event corresponds to a time when the confined sensor data was received from the at least one mobile computing device;
determine that a density associated with the other sensor data and the scheduling data gathered from the at least one different mobile computing device indicates that a location name is associated with the location; and
generate a digital map of the private space from the digital signature, the location associated with the private space, and the location name associated with the location.

10. The server of claim 9, wherein the processor is further operative to:

determine that the retrieved sensor data is correlated with at least one known user of the at least one mobile computing device; and determine a correlation between the retrieved sensor data and the scheduling data.

11. The server of claim 9, wherein the processor is further operative to:

determine that the retrieved sensor data is not correlated with at least one known user of the at least one mobile computing device;

determine that the retrieved sensor data is irrelevant with respect to the scheduling data; and discard the retrieved sensor data.

12. The server of claim 9, wherein the processor, in generating the digital map of the private space from the digital signature and the location associated with the private space, is operative to:

determine that the retrieved sensor data comprises new sensor data;

create a new entry for the location associated with the private space in a database; and store the new sensor data and a name associated with the new entry in the database.

13. The server of claim 12, wherein the processor, in generating the digital map of the private space from the digital signature and the location associated with the private space, is operative to:

determine that the new sensor data is irrelevant with respect to sensor data associated with the private space which has been previously stored in a database and another location associated with another private space; and discard the retrieved sensor data.

14. The server of claim 9, wherein the processor, in generating the digital map of the private space from the digital signature and the location associated with the private space, is operative to:

determine that the retrieved sensor data comprises a combination of new sensor data and the sensor data associated with the private space which has been previously stored in a database;

determine a correlation between the new sensor data and the location associated with the private space; and augment the previously stored sensor data and the location associated with the private space with the new sensor data to generate the digital map.

15. The server of claim 9, wherein the processor, in generating the digital map of the private space from the digital signature and the location associated with the private space, is operative to:

determine that the retrieved sensor data comprises a combination of new sensor data and the sensor data associated with the private space which has been previously stored in a database;

determine a correlation between the new sensor data and another location associated with another private space;

augment the location and sensor data associated with another location with the new sensor data to generate the digital map; and send a query to the at least one mobile computing device to confirm the digital signature in the digital map.

16. A non-transitory computer-readable storage medium comprising computer executable instructions which, when executed by a computer, cause the computer to perform a method of generating maps of private spaces using mobile computing device sensors, the method comprising:

confining a collection of sensor data from at least one mobile computing device to a geographically restricted area;

receiving the confined sensor data from the at least one mobile computing device, the received sensor data including measurement information from a plurality of sensors of the at least one mobile computing device, wherein the measurement information includes a measurement of signal strength;

determining a digital signature based on the measurement information from the plurality of sensors, the digital signature describing a private space;

determining whether the received sensor data is correlated with at least one known user of the at least one mobile computing device;

receiving scheduling data gathered from the at least one mobile computing device upon determining that the received sensor data is correlated with the at least one known user of the at least one mobile computing device, the scheduling data including a name associated with the private space and a time of an event;

determining a correlation between the received sensor data and the scheduling data by determining that the time of the event corresponds to a time when the confined sensor data was received and determining that a density of other sensor data and location data gathered from a plurality of other mobile computing devices indicates that the location name is associated with the location, wherein the other sensor data is utilized to create other digital signatures for mapping private spaces; and generating a digital map of the private space from the digital signature and the location data associated with the private space, and the location name associated with the location.

17. The non-transitory computer-readable storage medium of claim 16, further comprising:

discarding the received sensor data upon determining that the received sensor data is not correlated with the at least one known user of the at least one mobile computing device.

18. The non-transitory computer-readable storage medium of claim 16, wherein generating the digital map of the private space from the digital signature and the location associated with the private space comprises:

determining that the received sensor data comprises new sensor data;

creating a new entry for the location associated with the private space in a database; and storing the new sensor data and a name associated with the new entry in the database.

19. The non-transitory computer-readable storage medium of claim 16, wherein generating the digital map of the private space from the digital signature and the location associated with the private space comprises:

determining that the received sensor data comprises a combination of new sensor data and the sensor data associated with the private space which has been previously stored in a database;

determining a correlation between the new sensor data and the location associated with the private space; and augmenting the previously stored sensor data and the location associated with the private space with the new sensor data to generate the digital map.

20. The non-transitory computer-readable storage medium of claim 16, wherein generating the digital map of the private space from the digital signature and the location data associated with the private space comprises:
   determining that the received sensor data comprises a combination of new sensor data and the sensor data associated with the private space which has been previously stored in a database;
   determining a correlation between the new sensor data and another location associated with another private space;
   augmenting the location data and sensor data associated with another location with the new sensor data to generate the digital map; and
   sending a query to the at least one mobile computing device to confirm the digital signature in the digital map.

* * * * *